Oct. 5, 1965  A. G. MORROW  3,209,526
DEFLECTOR AND GUIDE MEANS FOR AN ENDLESS PICK-UP CONVEYOR
Filed Oct. 17, 1963  2 Sheets-Sheet 1
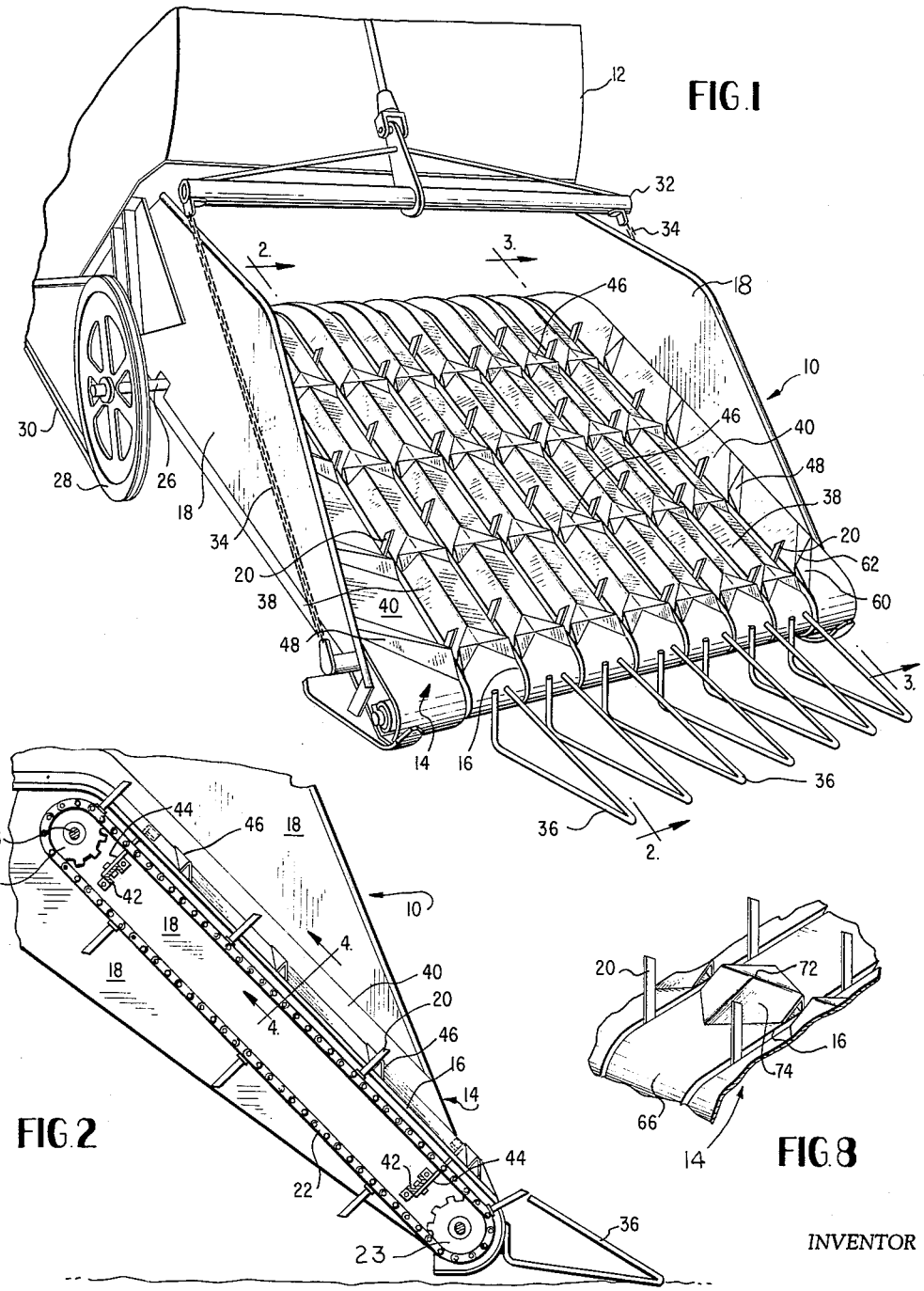
INVENTOR
AUSTIN G. MORROW
BY Kenyon, Palmer, Stewart & Estabrook
ATTORNEYS Oct. 5, 1965  A. G. MORROW  3,209,526
DEFLECTOR AND GUIDE MEANS FOR AN ENDLESS PICK-UP CONVEYOR
Filed Oct. 17, 1963  2 Sheets-Sheet 2
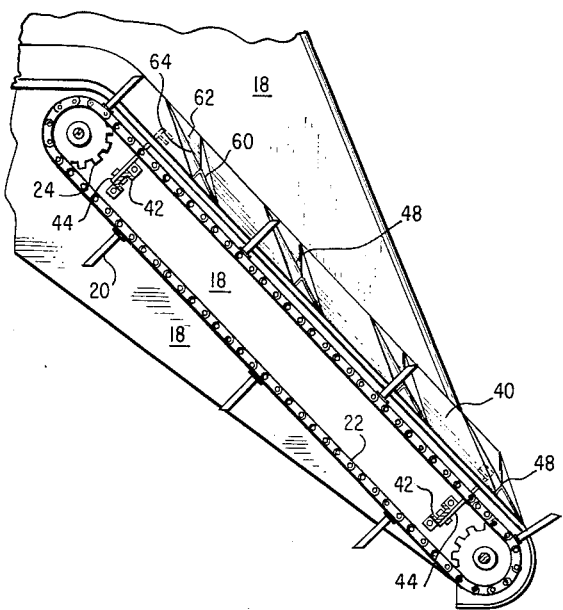
FIG. 3
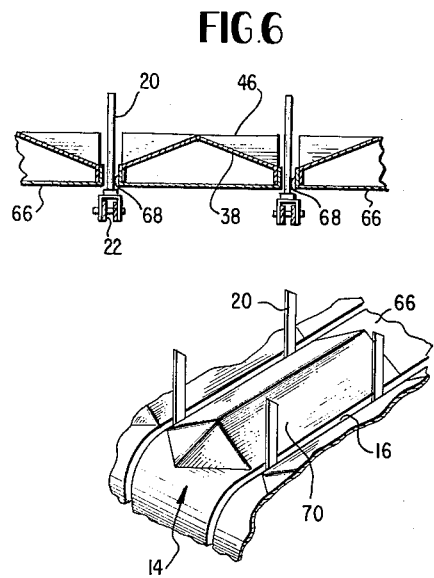
FIG. 6
FIG. 7
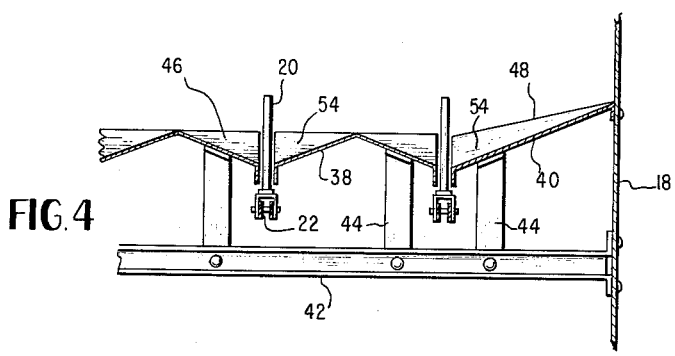
FIG. 4
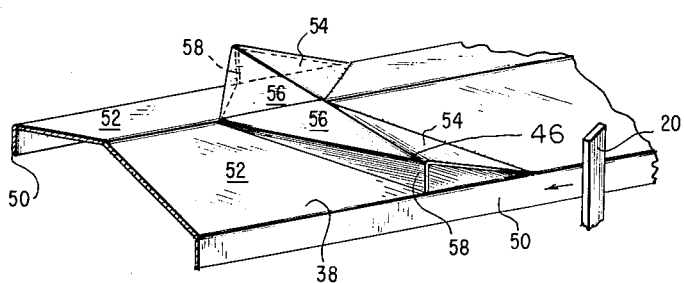
FIG. 5
INVENTOR
AUSTIN G. MORROW
BY *Kenyon, Palmer, Stewart & Estabrook*
ATTORNEYS United States Patent Office 3,209,526
Patented Oct. 5, 1965

3,209,526
DEFLECTOR AND GUIDE MEANS FOR AN
ENDLESS PICK-UP CONVEYOR
Austin G. Morrow, East Star Route, Box 65A,
Portales, N. Mex.
Filed Oct. 17, 1963, Ser. No. 316,821
5 Claims. (Cl. 56—345)

This invention relates to harvesting devices and, in particular, to a new and improved pickup unit for peanut combines or the like.

In the art of harvesting peanuts, the plants are generally harvested by hand or machines and placed in windrows to dry. At a later date the plants are picked up by a separate combine or machine in which the peanuts are thrashed, removing the vines from the nuts. As an example of the type of combine in general use in peanut harvesting, reference is made to the U.S. Patent 3,974,467 to Long. This combine is especially exective in harvesting peanuts of varities such as the Spanish peanut, however, certain problems have been encountered in using the pickup mechanism shown in the Long patent in harvesting of certain types of peanuts such as the Valencia peanut. Peanut plants of the Valencia variety are extremely fragile and require special types of handling equipment, otherwise the peanuts tend to be separated from the plants during harvesting and pickup resulting in substantial crop losses. In past practice it has been common to modify the Long combine with a special pickup designed to handle the Valencia type peanut more gently and, therefore, avoid separation of the peanuts from the plants during the pickup stage of the thrashing. The pickups which have been used are, in general, of a type disclosed in the U.S. patent to Harrington et al., 3,098,340 and, particularly, FIGURES 2 through 4 of this patent. These pickups consist, briefly, of an inclined ramp having longitudinal slots transversely spaced across the width thereof. A plurality of pull bars, suitably mounted on a chain drive beneath the ramp, extend through the slots and, when the chain is provided with a suitable drive, operate to engage vines in the windrow and pull them up the ramp into the combine.

While the above-described apparatus has been found to be more satisfactory for use in loading peanut plants of the Valencia variety into combines, it has been found that serious drawbacks still remain when this device is used. Dirt tends to collect between the windrow pull bars on the flat surfaces because of the primarily flat configuration of the inclined ramp. The collection of dirt ultimately tending to hold the windrow back and pull or shake peanuts off the vines as they are pulled over these collection points. This configuration also allows great quantities of dirt, trash, and other foreign material to be drawn into the combine, aggravating the problems of cleaning and separating the various components of the plant in the combine. Another disadvantage resulting from the overall configuration of the prior devices is that peanuts, separated from the plant, tend to roll back down the inclined ramp and are lost unless they happen to fall directly into the drag path of a vine. Due to the peculiarities of the Valencia type peanut plant, losses of peanuts from this source have been quite large in past operations.

It is an object of this invention to provide an improved peanut windrow pickup which avoids the above-stated difficulties.

It is further an object of this invention to provide a peanut windrow pickup which eliminates great quantities of dirt and trash which are normally pulled into the plant processing equipment by providing a new and improved configuration to the pickup ramp.

It is another object of this invention to provide a peanut windrow pickup which provides clean and trouble-free operation due to its unique configuration and eliminates clogging and dirt build-up in the machine with the attendant rough treatment of peanut vines and loss of peanuts.

It is a further object of this invention to provide a peanut windrow pickup which, through its unique configuration, prevents the loss of peanuts knocked from the plants during the pickup process.

It is still another object of this invention to provide a device which can be readily attached to existing windrow pickups to achieve the above-stated objects without changing the basic operation of the pickup mechanism itself.

These objects and other attendant advantages will become more obvious to those skilled in the art by reference to the following detailed description when read in light of the accompanying drawings in which like numerals indicate like parts throughout the figures thereof and wherein:

FIG. 1 is a perspective view of a pickup device embodying the invention positioned on a peanut combine;

FIG. 2 is an elevational view of the device of FIG. 1 taken in section along the lines 2—2 of FIG. 1;

FIG. 3 is an elevational view similar to FIG. 2 taken along the lines 3—3 of FIG. 1;

FIG. 4 is an enlarged transverse sectional view, partly broken away, taken along the lines 4—4 of FIG. 2;

FIG. 5 is an enlarged detail perspective of a portion of the structure of FIG. 1 constituting the invention;

FIG. 6 is a transverse sectional view similar to FIG. 4 of an embodiment of the invention adapted to be installed as a retro-fit on existing pickup devices;

FIG. 7 is a perspective detail view of a portion of a pickup device embodying a variation of the invention;

FIG. 8 is a perspective detail view of a portion of a pickup device embodying another variation of the invention.

The objects of this invention are achieved, briefly, by providing gabled structure between each adjacent row of pull bars in the pickup mechanism. The gables under the influence of the vines traveling thereover, direct dirt, trash and other foreign matter which would normally tend to collect on flat surfaces between the pull bars toward the pull bar slots so that the foreign matter drops through the slots and sifts by the chains onto the ground. This invention further provides wedge-shaped deflectors which, in combination with the gabled portions, further direct foreign material toward the pull bar slots, and, also, through the unique shape of the upper surfaces deflect peanuts knocked loose from the plants toward the pull bar slots so that they are engaged by the upwardly moving pull bars and are ultimately conveyed into the combine for further processing.

Referring now to FIG. 1 of the drawings for a more complete understanding of the invention, a pickup device shown generally at 10, is connected in a conventional manner to the front of a combine 12. The pickup device is conventional in its overall general configuration, and does not constitute the particular invention claim herein. The pickup device consists of an inclined ramp, generally indicated at 14, having transversely spaced slots 16 disposed therein. The ramp 14 is bounded on either side by containing side members 18. Pull bars 20 operate in slots 16 and are moved upward on the ram 14 by chains 22 (FIG. 2). The chains 22 traverse idler sprockets 23 and are powered, through sprockets 24 (FIG. 2) by a drive shaft 26 which, in turn, is driven by a pulley 28 driven by a belt 30 from a suitable power source in the combine 12. A conventional suspension ring comprising a bar 32 and chains 34 pivotally suspends the pickup device in front of the combine. Depending from the forward edge of the pickup device are pickup bars 36 which serve to direct windrowed peanuts or the like onto the ramp 14 as the pickup device moves forward ahead of the combine.

In operation, the basic pickup unit, as thus far described, precedes the combine 12 along a windrow of peanut plants or the like. The pickup bars 36 deflect the plants upwardly onto the ramp 14 at which time the upwardly traveling pull bars 20 engage the plants and drag them into the combine 12.

This invention comprises a new and improved ramp surface which consists of gables 38 disposed between each of the slots 16 and end gables 40 disposed between the endmost slots 16 and the side members 18. The gables may be installed in the machine in any suitable manner. Referring to FIGS. 2 and 4, cross members 42 attached at either end thereof to the side members 18 have mounted thereon support members 44, spaced along the cross member. The members connect the respective gables 38 and 40 to the structural frame.

In the operation of the invention, as thus far described, gables 38 and 40 serve to provide inclined planes between and sloping toward each of the slots 16. During the pickup process, dirt, trash and other foreign objects in or around the peanut windrow are picked up by the device and tend to be dragged into the combine along with the peanut plants. Under the influence of gravity, vibration and the brushing action of the plants being dragged up the ramp 14, the dirt and foreign material passing over these surfaces tend to drift toward the slots 16 and to be eliminated from the device by sifting out of the slots. This result provides a distinctive advantage over prior machines which heretofore have utilized relatively flat surfaces between slots 16. In prior machines, the flat surfaces tended to provide a collecting point for dirt, trash and foreign material. These accumulations impeded the flow of plants up the ramp and dirt subsequently dragged into the combine contaminates and complicates the thrashing process.

Referring again to FIGS. 1 and 2 of the drawings, the ramp 14 has mounted thereon deflectors 46, disposed at spaced points along the gables 38 between each of the slots 16. End deflectors 48 are similarly disposed at spaced points along the side gables 40 between the end slots 16 and the side members 18. Referring specifically to FIG. 5, a preferred form of the combined gable 38 and deflector 46 structure is shown. In this embodiment both the gable and deflector are formed from sheet metal, the gable being formed with vertical slides 50 disposed to define the sides of the slots 16 (FIG. 1) for the travel of the pull bar 20. The upper face of the gable is comprised of transversely sloping faces 52 forming an inverted trough-like structure. The deflectors 46 are disposed at any desired interval along the faces 52 of the gable 38, and are comprised, on either side of the peak of the gable, of a sloping triangular forward face 54, a flat triangular upper face 56 and a rear, forwardly sloping face 58. The structure is suitably formed to fit the contour of the cable faces 52 as shown. Although the deflectors are preferably welded to the gable, any suitable form of connection may be used.

Referring to FIG. 3 the end deflectors 48 are shown in elevation. These deflectors, like the deflectors 46, may also be formed of sheet metal and are comprised of a sloping triangular forward face 60, a flat triangular top face 62 and a rear, forwardly sloping face 64. As with the deflectors 46, the deflectors 48 may be connected to their respective gables by welding or like means.

The ends of the respective deflectors may be open as shown or formed with closed ends, if desired.

In the operation of the device, peanuts, knocked loose from the plants as they are traversing the ramp 14, tend to roll down the ramp under the influence of gravity. Heretofore, unless the nuts were directly in line with a plant being moved up the ramp, they would roll off the ramp and drop onto the ground. With the improvement of this invention, peanuts rolling down the ramp 14, engage the rear face 58 of the deflectors 46 or the rear face 64 of the deflectors 48 and are deflected towards the slots 16 where they are retained until engaged by one of the pull bars 20 which then conveys the peanuts so retained up into the combine. The forward faces 54 and upper faces 56 present a configuration of low resistance to plants and peanuts traveling upwardly thereover, thereby preventing blockage of the flow of plants onto the combine.

Obviously the configuration of the deflectors 46 and 48 may be such as to include or embrace various geometrical shapes and configurations and still accomplish the same objectives as intended in the embodiment shown. The longitudinal disposition of the deflectors 46 and 48 may be varied as desired so long as the matching deflector faces 58 and/or 64 across the slots 16 are disposed adjacent one another on the ramp. This disposition is required since nuts rolling down the face 58 and 64 towards the slot 16 must meet a converging face on the adjacent deflector in order to be retained at the slots until engaged by a pull bar. The configuration of gables 38 in cross section, preferably describes an isosceles triangle but may, if desired, be arcuate, octagonal or otherwise configured without altering the operation of the invention.

Referring to FIG. 6, a variation of the invention is shown. This variation is adapted to being installed on existing pickups as a retro-fit unit. In this embodiment, the gable and deflector structure as shown in FIG. 5 is provided for installation on existing pickup ramps. The ramp shown is typical of prior art ramps and is made up of flat ramp strips 66, disposed between each of the pull bars 20 as shown. The slots which accommodate pull bars 20 are bounded by upstanding edges 68. To accomplish the retro-fit, the gables 38 and deflectors 48 are inserted between the upstanding edges 68 and attached to the strips 66 by welding or any other suitable process. The end gables 40, equipped with the deflectors 48, are installed at either side of the pickup mechanism in a similar manner.

The device, as heretofore described, can be installed on any pickup machine which encounters the aforementioned problems. The gables and deflectors may both be installed where required or may be installed as individual modifications where individual requirements dictate. Referring to FIG. 7, a modified gable 70 is shown attached to the strip 66 of a pickup device. In this embodiment, the gable is installed alone without the use of the deflectors. This variation is useful where the type of plant is not fragile and little loss of fruit occurs in the handling thereof. Also, as shown, the gable may be shorter in length than the ramp 14. FIG. 8 is another modification embodying the invention. Here only a deflector 72 is provided. The rear face of the deflector is identical to and serves the same purpose as the face 58 of the deflector 46 (FIG. 5). The deflector 72 is, however, provided with a deflecting forward face 74 which, in a manner similar to gables 38 (FIG. 5) deflects dirt and foreign matter toward slots 16.

What is set forth above is merely exemplary of an embodiment of the invention to enable those skilled in the art to better understand the practice thereof. Obviously many variations and modifications may be made in the light of these teachings.

It should, therefore, be understood that, within the scope of the appended claims, the invention may be practiced otherwise than is specifically described.

What is claimed as new and desired to be protected by Letters Patent of the United States:

1. In a windrow pickup for combines comprising an inclined pickup conveyer surface which is continually swept by a plurality of rows of aligned pull bars projecting from slots longitudinally disposed in said surface, the improvement which comprises in combination:

a gable disposed between each of said slots, said gable having inclined surfaces sloping toward each adjacent slot, said surfaces serving to divert foreign matter moving thereover toward said slots for discharge therethrough;

at least one deflector transversely mounted on each surface of said gable between said slots, said deflector having downward and an upward deflecting face thereto, said downward face being upwardly sloping and disposed at an acute angle with respect to said gable surface in a longitudinal plane normal to said gable surface to provide unimpeded flow of the picked up crops thereover, said upward deflecting face being disposed substantially normal to said gable surface in a longitudinal plane normal to said gable surface and sloping transversely downward from the longitudinal centerline of said gable toward said slots, whereby the surfaces of said gables and said upward deflecting face in combination divert loose harvested fruit moving contrary to the direction of travel of the picked up crops toward said slots for engagement by said pull bars.

2. In a windrow pick up for combines comprising an inclined pickup conveyer surface which is continually swept by a plurality of rows of aligned pull bars projecting from slots disposed longitudinally in said surface, the improvement which comprises at least one deflector transversely mounted between each of said slots, said deflectors being formed with at least one upward and one downward deflecting face thereto, said downward face being upwardly sloping disposed at an acute angle with respect to said conveyer surface in a longitudinal plane normal to said conveyer surface to provide unimpeded flow of the picked up crops thereover, said upward deflecting face being disposed substantially normal to said conveyer surface in a longitudinal plane normal to said conveyer surface and slanting transversely downward from the longitudinal centerline thereof each of said slots whereby said upward deflecting face diverts loose harvested fruit moving contrary to the direction of the travel of said picked up crop toward said slot for engagement by said pull bars.

3. A windrow pickup for combines comprising an inclined pickup conveyer surface which is continually swept by a plurality of rows of aligned pull bars projecting from slots disposed longitudinally in said surface, the improvement which comprises a plurality of deflectors transversely mounted at longitudinally spaced points between each of said slots, said deflectors having a pair of downward deflecting faces said downward deflecting faces being upwardly sloping and disposed at an acute angle with respect to said conveyer surface in a longitudinal plane normal to said conveyer surface and slanting upwardly transversely of said slots from a point midway between said slots toward said slots at the point of intersection between said downward deflector faces and said conveyer surface to divert foreign matter moving thereover toward said slots for discharge therethrough while providing substantially unimpeded passage of picked up crops thereover, said deflectors further being formed with a pair of upward deflecting faces disposed substantially normal to said conveyer surface in a longitudinal plane normal to said conveyer surface and slanting transversely downward from the longitudinal centerline thereof toward each of said slots whereby said upward deflecting faces diverts loose harvested fruit moving contrary to the direction of travel of said crop toward said slots for engagement by said pull bars.

4. In a windrow pickup for combines comprising an inclined pickup conveyer surface which is continually swept by a plurality of rows of aligned pull bars projecting from slots disposed longitudinally in said surface, the improvement which comprises a combination:

a gable disposed between each of said slots, said gable comprising an inverted trough defining in transverse cross section in a geometrical configuration having its greatest height disposed substantially between said slots and sloping toward each of said slots to divert foreign matter moving thereover towards slots for discharge therethrough;

a plurality of deflectors transversely mounted at longitudinally spaced points on each of said gables between said slots, said deflectors being formed with an upwardly sloping downward deflecting face disposed at an acute angle with respect to said gables in a longitudinal plane normal to said gable to provide unimpeded flow of picked up crops thereover, said deflectors further being formed with an upward deflecting face disposed substantially normal to said gable in a longitudinal plane normal to said gable surface and slanting transversely downward from the centerline of said gable toward each of said slots, whereby said gables and said upward deflecting face in combination divert loose harvested fruit moving contrary to the direction of travel of said picked up crops toward said slots for engagement by said pull bars.

5. A device in accordance with claim 4 wherein said gables are substantially co-extensive in length with said conveyer surface.

References Cited by the Examiner
UNITED STATES PATENTS

| | | | |
|---|---|---|---|
| 414,738 | 11/89 | White | 130—23 |
| 974,476 | 2/11 | Dauner | 198—190 X |
| 3,098,340 | 7/63 | Harrington et al. | 56—345 |

ANTONIO F. GUIDA, *Acting Primary Examiner.*

T. GRAHAM CRAVER, *Examiner.*